United States Patent
Noetzelmann et al.

(10) Patent No.: US 8,952,965 B2
(45) Date of Patent: Feb. 10, 2015

(54) NON-LINEAR TIME SCALE OPTIMIZATION FOR MECHANICAL-ELECTRICAL MACHINE BEHAVIOR MODEL VISUALIZATION

(75) Inventors: Oswin Noetzelmann, Monmouth Junction, NJ (US); Marko Bogeljic, Klagenfurt (AT); Jochen Handels, Köln (DE); Amir Davari Jazin, Bonn (DE); Karoly Kiraly, Bonn (DE); Dirk Schwarz, Egloffstein (DE)

(73) Assignee: Siemens Aktiengesellschaft, Munich (DE)

( * ) Notice: Subject to any disclaimer, the term of this patent is extended or adjusted under 35 U.S.C. 154(b) by 1053 days.

(21) Appl. No.: 13/013,203

(22) Filed: Jan. 25, 2011

(65) Prior Publication Data
US 2012/0019553 A1    Jan. 26, 2012

Related U.S. Application Data

(60) Provisional application No. 61/366,248, filed on Jul. 21, 2010.

(51) Int. Cl.
  G06T 11/20    (2006.01)
  G05B 19/05    (2006.01)
(52) U.S. Cl.
  CPC ...... *G05B 19/05* (2013.01); *G05B 2219/13147* (2013.01)

USPC .............................................. 345/440; 703/4
(58) Field of Classification Search
  None
  See application file for complete search history.

(56) References Cited

U.S. PATENT DOCUMENTS

| 3,553,372 | A  | * | 1/1971  | Wright et al. ............... 704/211 |
| 5,177,420 | A  | * | 1/1993  | Wada et al. ............. 318/568.11 |
| 5,790,118 | A  | * | 8/1998  | Bertram ...................... 715/744 |
| 7,348,981 | B1 | * | 3/2008  | Buck ......................... 345/440.2 |
| 8,566,359 | B1 | * | 10/2013 | Donohoe et al. ............ 707/793 |
| 8,688,260 | B2 | * | 4/2014  | Stummer ..................... 700/200 |

FOREIGN PATENT DOCUMENTS

EP       1077396 A1 *  2/2001 ............. G05B 19/05

* cited by examiner

*Primary Examiner* — David H Chu

(57) ABSTRACT

A visual representation of a mechanical-electrical machine behavior model is presented that utilizes a non-linear time scale to best illustrate multiple details occurring in a relatively short time frame without affecting the amount of information contained in the complete model. In particular, time periods without user-relevant details are identified and minimized so as to allow for the display space to adequately represent the details associated with the actions of each machine. By "folding" these longer time periods to occupy relatively short lengths along the time axis, additional space along the time axis is then available to illustrate the details of each operation (i.e., by using a non-linear time scale).

7 Claims, 7 Drawing Sheets

NON-LINEAR TIME SCALE OPTIMIZATION FOR MECHANICAL-ELECTRICAL MACHINE BEHAVIOR MODEL VISUALIZATION

CROSS-REFERENCE TO RELATED APPLICATIONS

This application claims the benefit of U.S. Provisional Application No. 61/366,248, filed Jul. 21, 2010, which is herein incorporated by reference.

TECHNICAL FIELD

The present invention relates to a visual representation of a mechanical-electrical machine behavior model and, more particularly, to a visual representation that utilizes a non-linear time scale to best illustrate multiple details occurring in a relatively short time frame without affecting the amount of information contained in the complete model.

BACKGROUND OF THE INVENTION

In the automation field, and more specifically during operational machine planning for a plant, an engineer traditionally creates a model that describes all of the machines that will be involved in the plant operation phase. This model contains a detailed description of each step that must be performed by each machine in the operational phase, as well as how these steps interact. FIG. 1 is a prior art illustration of one such planning program, where a mechanical machine operation model is shown in step 120 and contains a detailed description of each step that each machine 115 performs in the operational process, as well as how those steps interact. The model is traditionally created in the form of a sequence diagram that shows machine behavior over time in a graphical format. Today, software tools provide meta-models for describing mechanical machine operation models and allow for convenient graphical creation and editing of these mechanical models.

In order to program digital controllers to operate machines 115, mechanical machine operation model 120 is traditionally given to an engineer that is familiar with programmable logic controller (PLC) programming and he or she abstracts the mechanical model (represented at step 125) and creates at step 127 a PLC program 128 that realizes the requirements described in mechanical model 120. For example, the logic may include logic for starting/stopping signals for machines 115 in the correct timing sequence, as well as safety-critical features such as interlocks and timeout detection. The engineer typically adds sensors and actuators to the mechanical information, as those components are often missing in the original mechanical model as provided to the engineer.

The abstraction of the mechanical model developed at step 120 depends on the programming method the engineer chooses. Examples of methods for programming a PLC include STL (an assembler-like language for Siemens PLCs), Ladder Logic, and Step Chain Programming, with Step Chain Programming considered the most advanced of the three methods. If a user chooses STL, he is required to do the most abstraction, since a program must be formulated from only basic instructions. For ladder logic, the user is assisted by a ladder diagram visual display of the logic. For step chain programming, the user must identify the steps in the program based on the mechanical description (i.e., the sequence diagram) and determine the exact sequence of steps in the PLC, as well as identify the need for input signal conditions.

In each case, these traditional systems may be error-prone, due to the required manual abstraction and the complexities faced by the engineer, and may be time-consuming for the same reasons.

A system that addresses these concerns is described and disclosed in our co-pending application Ser. No. 12/547,015, entitled "Visualization Method for Electrical Machine Operation Models Based on Mechanical Machine Operation Models" for O. Noetzelmann et al., filed Aug. 25, 2009, assigned to the present assignee and herein incorporated by reference. In the Noetzelmann et al. application, a computer and display combination is used to create a combined mechanical and electrical sequence graph consisting of steps, transitions and conditions arranged by the dimensions of the participating resources as a function of time. The visualization of the model takes the form of a "display space" that is divided into device subspaces, each subspace corresponding to a different device represented by the electrical machine operation model. The ability to visualize the model provides a significant advance in the state of the art.

However, due to the restraint of a linear timeline, a sequence graph produced using this visualization process can become confusing or unclear in certain scenarios. For example, if a particular graph consists of a number of very short (in terms of "time") steps and very long steps, the transitions between the short steps will be so compressed as to become overlapped. It then becomes difficult for the user to properly identify all of the relationships between devices and signals.

Thus, a need remains for a way to improve the performance of the above-described visualization method.

SUMMARY OF THE INVENTION

The need remaining in the prior art is addressed by the present invention which relates to a visual representation of a mechanical-electrical machine behavior model and, more particularly, to a visual representation that utilizes a non-linear time scale to best illustrate multiple details occurring in a relatively short time frame without affecting the amount of information contained in the complete model.

In accordance with an embodiment of the present invention, time periods without user-relevant details are identified and minimized so as to allow for the display space to adequately represent the details associated with the actions of each machine. By "folding" these longer time periods to occupy relatively short lengths along the time axis, additional space along the time axis becomes available to illustrate the details of each operation (i.e., by using a non-linear time scale).

In one specific embodiment, a process is used to define a "distance in time" threshold for a specific display space being visualized, where time periods greater than the defined threshold are then shortened to a fixed size to create the desired non-linear time scale, permitting the details of each of the relatively short steps to be viewed in detail.

In a specific implementation of the present invention, each "point of interest" is first identified, a "point of interest" defined as a transition point in one of the modeled operations, as denoted by a starting time or ending time. The set of "points of interest" is then arranged chronologically and the time periods between each point determined. The "distance in time" threshold is then determined by viewing the span of points across the time axis of the display (and may be influenced by the specific parameters of the graphical display being used, number of pixels, dots per inch, or the like). Time periods between each point that are longer than the threshold are then shortened (i.e., "folded") to accommodate the available time span, resulting in a non-linear time scale visualization of the system.

It is to be understood that while certain time periods are compressed in the process, none of the detail associated with the specific electrical/mechanical steps is actually eliminated from the visualization.

One embodiment of the present invention is a computer-usable medium having computer readable instructions stored thereon for execution by a processor to perform methods as described above.

BRIEF DESCRIPTION OF THE DRAWINGS

Referring now to the drawings.

DETAILED DESCRIPTION

At a high level, the visualization process to be discussed in detail below is one component of a sequence designer that is used by engineers to understand, design and implement various operations in a factory, plant or the like. The sequence designer builds the bridge between the mechanical engineer and the automation engineer, allowing the user to describe the mechanical and electrical workflow of the plant in a completely digital model. As described below, the electrical information is automatically derived from the mechanical information. A tabular and graphical interface is then used for building and visualizing the machine behavior, and is capable of providing separate views for the mechanical information and the electrical information, but the data models associated with the process are connected between both views.

Figure 1:
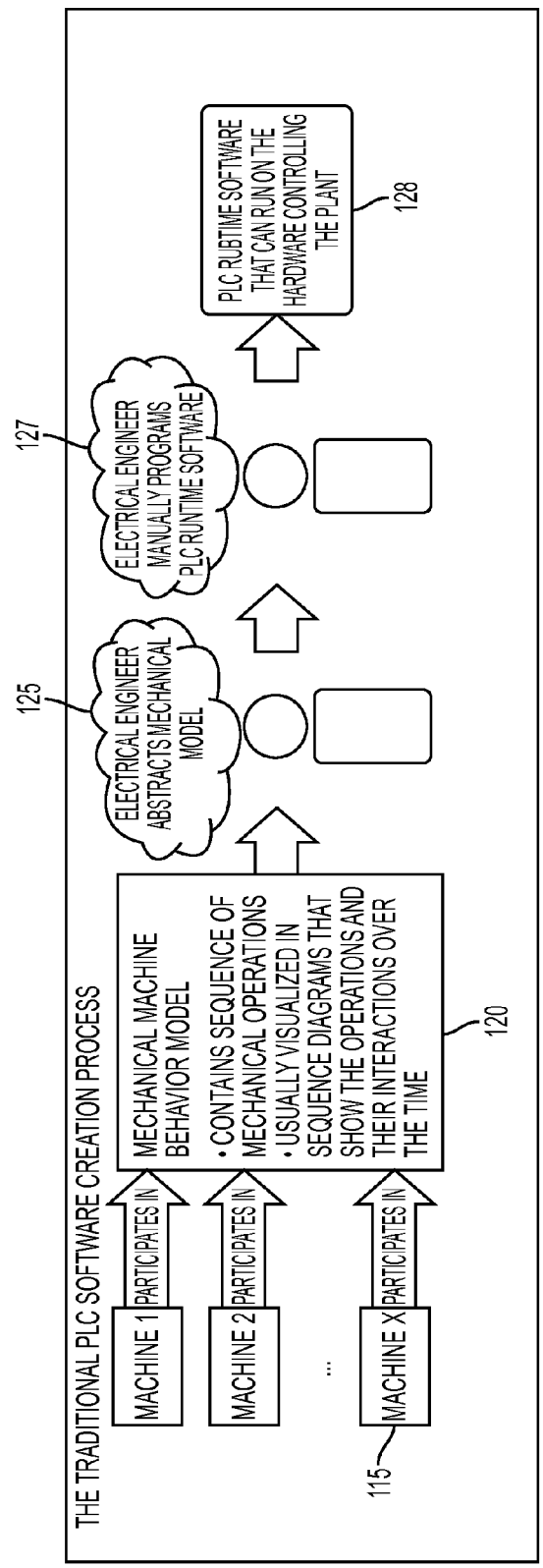
FIG. 1 is a schematic diagram showing a prior art PLC program creating process.
Figure 2:
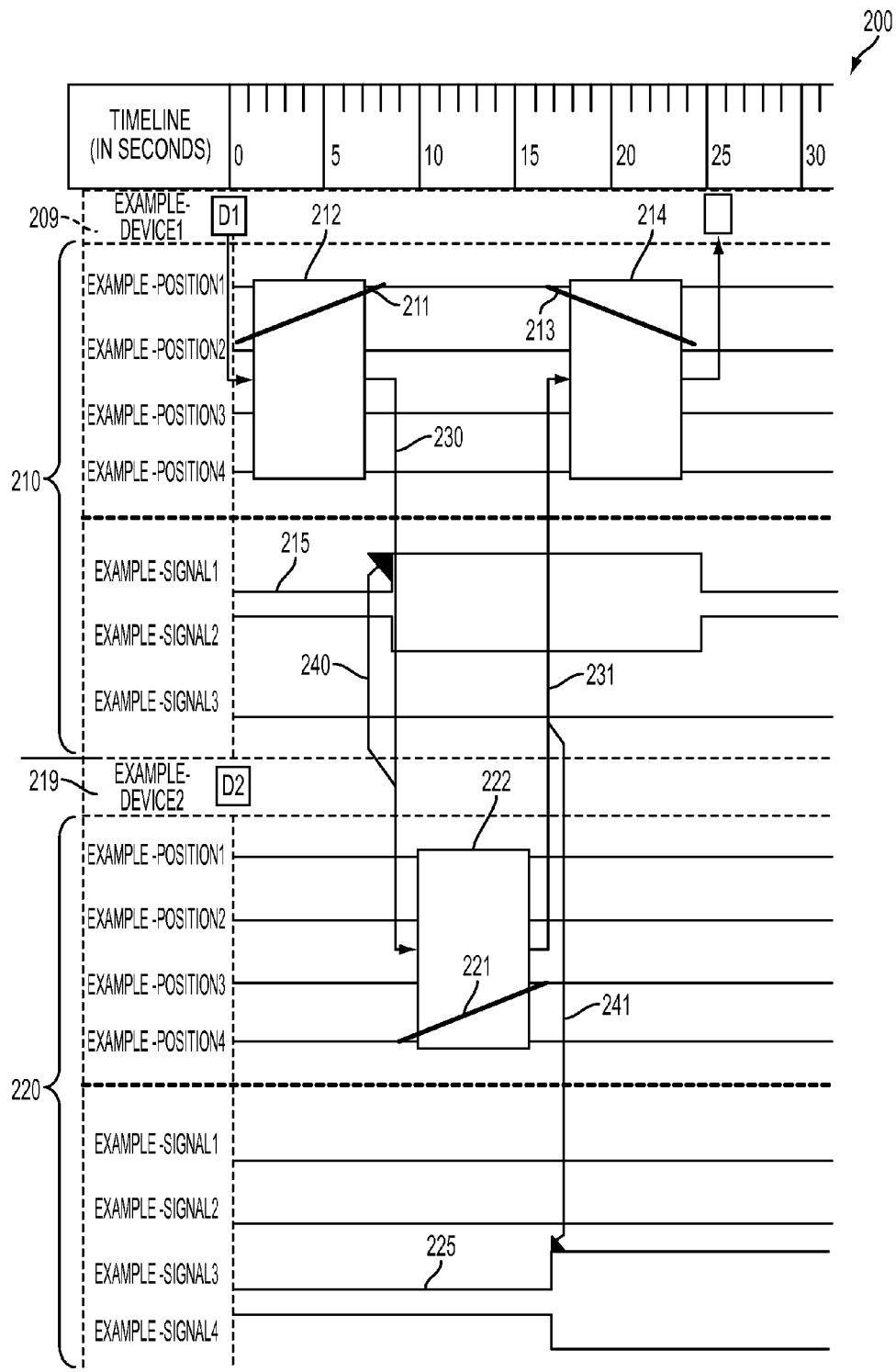
FIG. 2 is a schematic view of a display space showing a model visualization as depicted in the associated, co-pending Noetzelmann et al. application.

Indeed, it is considered helpful to have a full understanding of the visualization method described in our co-pending application prior to considering the details of using a non-linear time scale in such a visualization method. To that end, FIG. 2 is a schematic view of the model visualization process as described in our co-pending application. In its most general terms, the visualization of an electrical machine operation model is most useful in formulating a PLC (Programmable Logic Controller) program from a mechanical machine operation model. The electrical model may be derived automatically or semi-automatically from the associated mechanical model. The electrical machine operation model streamlines and improves the efficiency of the engineering process that is used in the automation field to create PLC programs that control machines in a manufacturing plant, a factory or the like.

In its simplest form, a mechanical machine operation model allows for the configuration of the mechanical steps that define various mechanical device state changes, identifying only the start and end positions defining a change in position for each machine (device) involved in the process. The exact physical behavior between the start and end points (including intermediate positions, velocity, acceleration and the like) is not described in the simplest case. Thus, a 'straight line' segment is used in FIG. 2 to represent each instance of a mechanical machine operation.

The electrical machine operation model is based on the mechanical model. It also includes steps and transitions, but does not include actions. The steps of the electrical machine operation model may additionally include so-called waiting steps wherein a user can add waiting times in the electrical model. The transitions of the electrical machine operation model may be very different from those of the mechanical model, because it is possible for a user to represent one mechanical sequence with multiple electrical sequences. For example, a user may define one electrical sequence per device. An important difference between the electrical machine operation model and the mechanical model is the fact that the electrical machine operation model has information about electrical (sensor and actuator) signals. The electrical machine operation model also stores conditions for those signals based on transitions between electrical steps.

The electrical machine operation model is created by creating electrical elements corresponding to the mechanical steps, signals and conditions. Electrical steps can also have interlock information, as well as additional signal output values. These parameters may be added manually by an engineer using the visualization technique described herein.

The visualization itself may be performed on a two-dimensional (or three-dimensional) display space such as that of computer or video display. The display may be part of a graphical user interface that may also include a keyboard, a mouse or other user interface devices, for interfacing with a computer. The display is controlled by one or more computers running one or more applications programs for performing the described visualization methods. It is further presumed that most (if not all) visualizations will need to show multiple devices and their interrelationships. FIG. 2 shows an exemplary display space 200, which is divided into a pair of subspaces 210, 220 (with the understanding that a typical space will contain many more subspaces, but for the sake of clarity only two such subspaces are shown in FIG. 2). A first device D1 is identified in device header space 209 and is represented in subspace 210. A second device D2 is identified in device header space 219 and is represented in subspace 220.

The device representation of subspace 210 includes two mechanical steps, shown as 211 and 213 in FIG. 2. An electrical step 212 is shown as superimposed on the underlying mechanical step 211, from which it was created. Similarly, an electrical step 214 is superimposed on the associated underlying mechanical step 213, from which it was created. The device representation of subspace 210 also includes signal representations, including a representation of signal 215, which becomes "high" after completion of mechanical step 211.

The device representation of subspace 220 includes a single mechanical step 221. An electrical step 222 is superimposed on the underlying mechanical step 221, from which it was created. The device representation of subspace 220 also includes signal representations including a representation of signal 225, which becomes "high" after completion of mechanical step 221.

As also shown in FIG. 2, a pair of electrical transitions 230 and 231 connect the electrical steps performed by different devices. In particular, electrical transition 230 connects electrical step 212, performed by device D1 as identified in device header space 209 (subspace 210), with electrical step 222 performed by device D2 as identified in device header 219 (subspace 220). Similarly, electrical transition 231 connects electrical step 222 with electrical step 214, performed by device D1.

Conditions are also shown for each of these electrical transitions. In particular, a first condition 240 makes the transition 230 conditional on signal 215 going "high", while a second condition 241 makes the transition 231 conditional on signal 225 going "high". It can be seen that conditions may be represented in space 200 whereby any transition may be made conditional on any related signal, regardless of the device with which the signal is associated. The conditions may be interactively changed by a user (for example, by dragging with a cursor) in order for a user to evaluate various conditions. While the transitions are shown conditional on changes in digital signal values, the transitions may alternatively be triggered by an analog signal reaching a threshold value.

Figure 3:
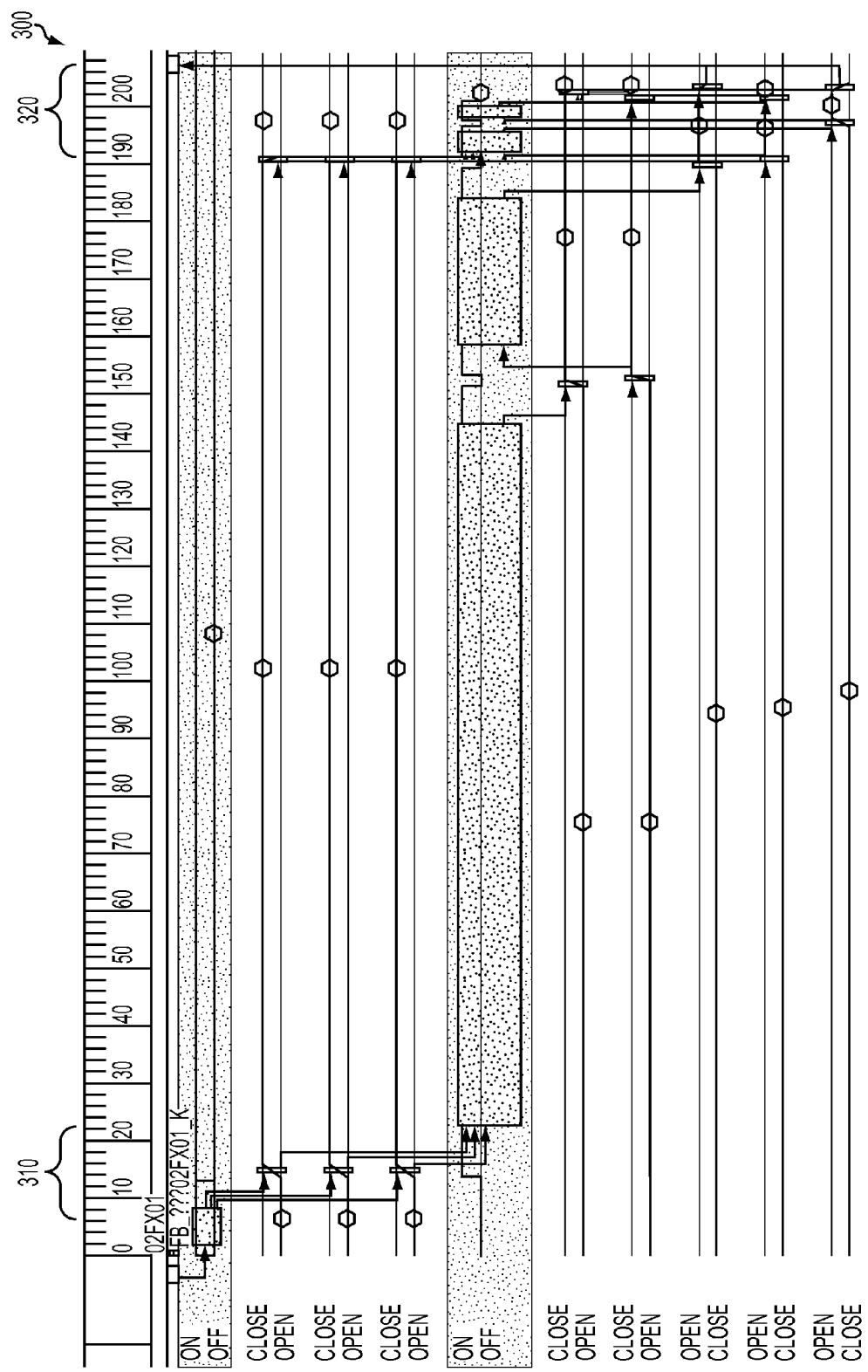
FIG. 3 is a schematic view of an exemplary model visualization that includes both short-time and long-time events.

While it is relatively easy to visualize the various components in display space 200, this is an idealistic view to assist in understanding the parameters of the visualization process and is not indicative of a 'real world' system. Indeed, FIG. 3 illustrates a display space 300 associated with a more realistic industrial process. As shown, this graph is rather complex and would be even more so if the "signal" portion of the graph were to be shown. As it is, only the mechanical and electrical steps are illustrated in space 300. Presuming that the time scale is measured in seconds, it is shown that there are a number of mechanical and electrical steps occurring between the 10 second marker and the 20 second marker, defined as time period 310. A second set of mechanical and electrical steps are shown as occurring during the 190-205 second interval (defined as time period 320). It is difficult to parse these different steps (as well as use a cursor or other device to manipulate separate ones of these steps) in this rather complex network of transitions as a result of their overlapped nature.

Thus, in accordance with the present invention, it is proposed to replace the linear time scale shown in FIGS. 2 and 3 with a non-linear time scale that allows for each event to be viewed without confusion. In particular, a unique non-linear time scale is developed for each specific visualization, rather than attempt to apply a generic non-linear policy to all such visualizations. To that end, a specific process is used in accordance with the present invention to determine the optimum non-linear time scale for the visualization of a specific plant operation under study, taking into consideration the size of the display space being used.

Figure 4:
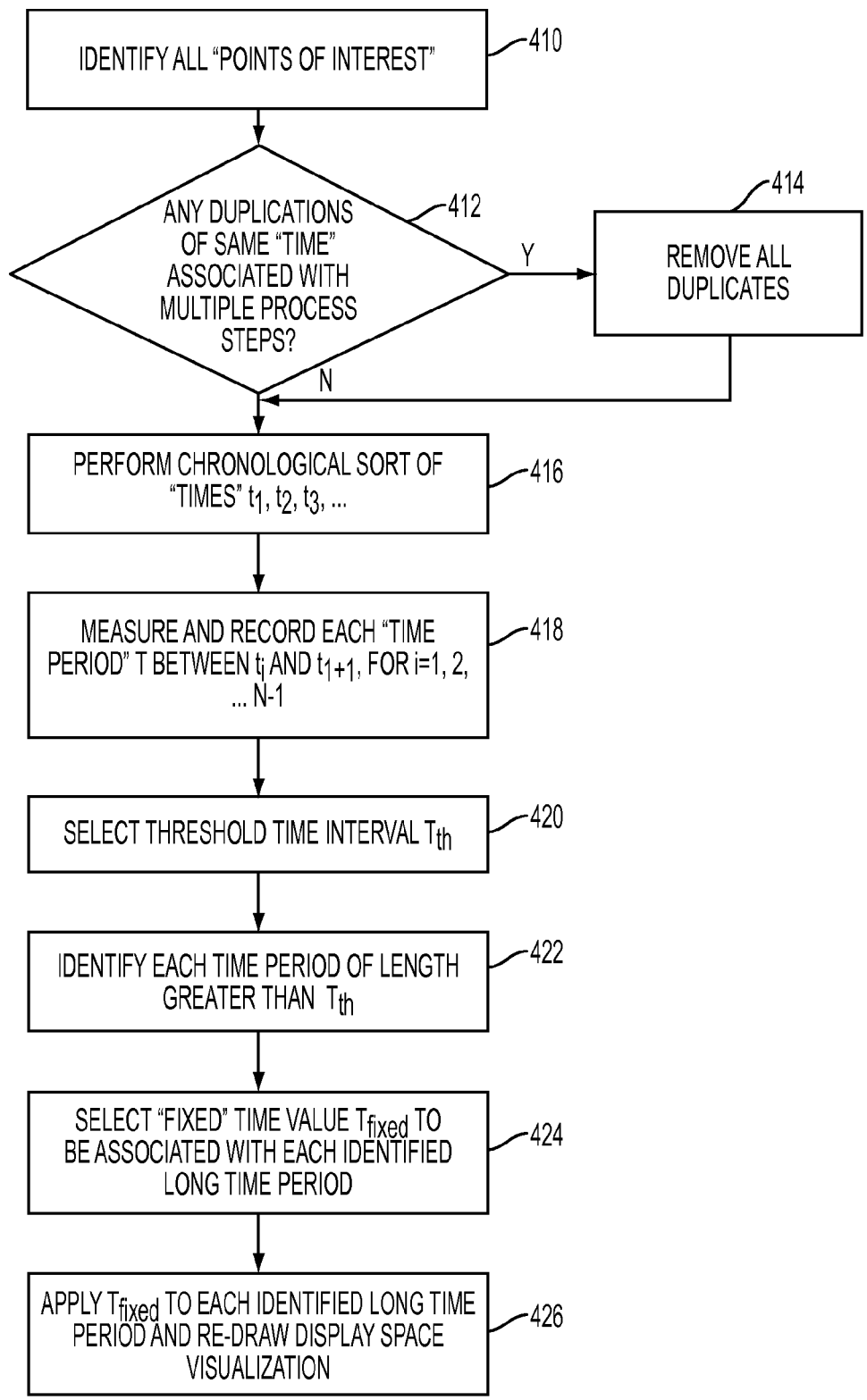
FIG. 4 is a flow chart of the non-linear process of the present invention.
Figure 5:
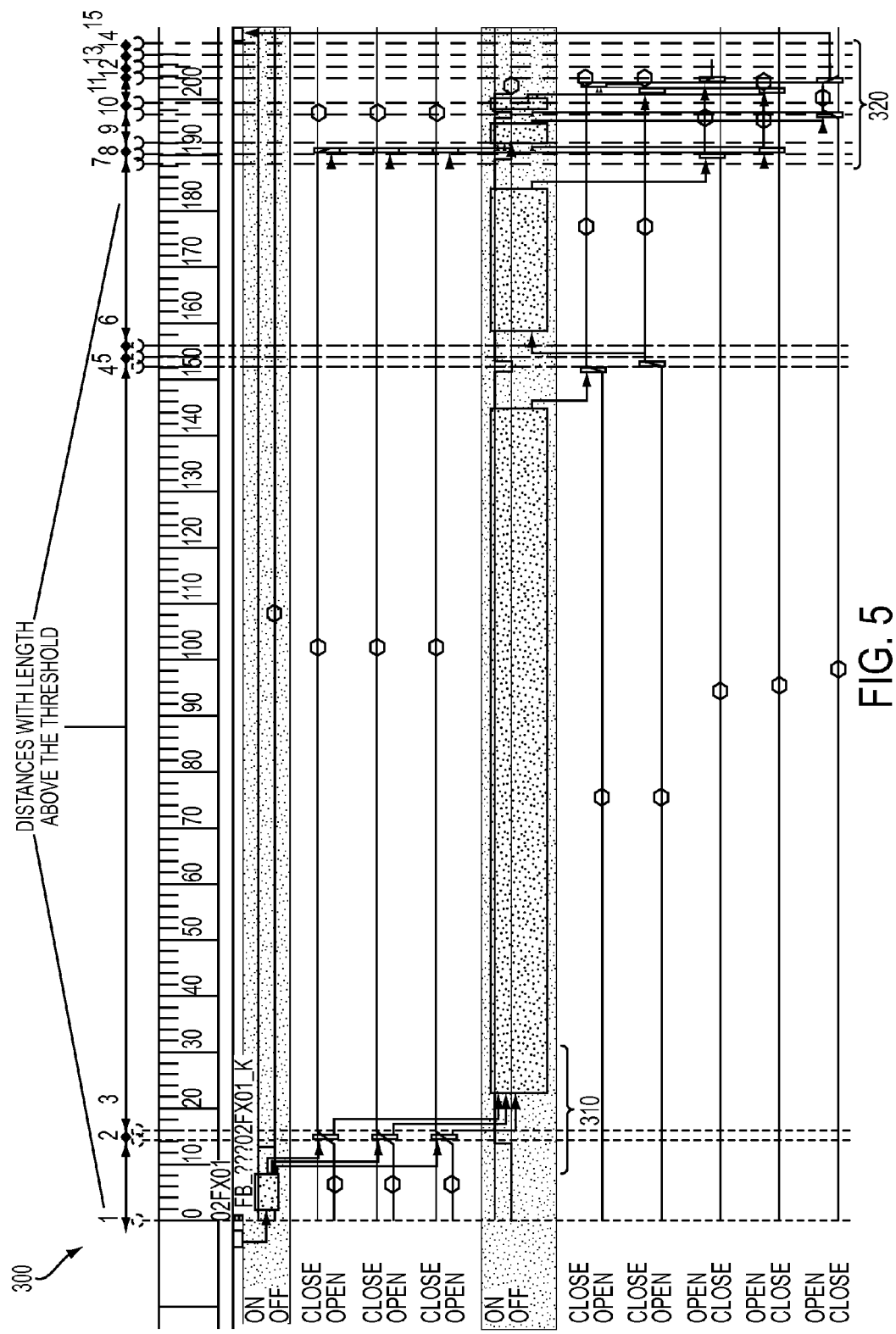
FIG. 5 is an updated view of the schematic of FIG. 3, including the designation of the various "points of interest" as determined by using the method as outlined in FIG. 4.

FIG. 4 contains a flowchart of an exemplary process of the present invention that is best understood in conjunction with display space 300 of FIG. 3, as re-created in FIG. 5 to show the implementation of the inventive process. With reference to FIG. 4, the process begins at step 410 by identifying all "points of interest" along the time axis. For the purposes of the present invention, a "point of interest" is a transition point in the mechanical and electrical model, equivalent to the start time or ending time of a specific step. It is to be noted that if a first 'transition' associated with one device occurs at the same point in time as a 'transition' associated with a separate device, that specific "point of interest" should only be counted once during this process. To that end, steps 412 and 414 in the process shown in FIG. 4 proceed to eliminate all duplicate time designations that may be associated with the starting and stopping of different electrical and mechanical elements in a specific process.

Once all duplicate points of interest (if any) are eliminated, the remaining points are sorted chronologically (step 416), resulting in this specific example as a set of fifteen specific points of interest along the time axis of display space 300 as depicted in FIG. 5. As shown, it is clear that points of interest 2 and 3 are relatively close together in time, causing the elements associated with this time period to be condensed into a relatively short span. Similarly, points 4, 5 and 6 are close together, as is the entire grouping of points 7 through 15. In contrast, there is a significant gap (i.e., period of inactivity where there is no user-relevant detail) between points of interest 3 and 4 of display space 300. Thus, if using this display space as the final working version of the visualization (as in our prior, co-pending application), there is a significant amount of wasted space, while a substantial amount of detail is crowded into a relatively short time period.

In accordance with the present invention, this limitation is overcome by proceeding with the next step in the process, shown as step 418, which is to measure and record the length of each time period $T_i$ between each point of interest, with the time period between points 1 and 2 defined as $T_1$, between points 2 and 3 defined as $T_2$ and so on.

Presuming that the linear time scale of FIG. 5 is measured in seconds, it is shown that some time periods are measured on the order of a "few" seconds, while others are more significant in their extent. For example, time period $T_3$ between points 3 and 4 is on the order of 134 seconds (spanning from 15.3 seconds to 149.5 seconds), while time period $T_6$ between points 6 and 7 is approximately 34 seconds (spanning from 154.2 to 187.4 seconds). By virtue of replacing the linear time scale (as shown in the visualization of FIG. 5) with a non-linear scale in accordance with the present invention, the "empty" time intervals (such as $T_3$ and $T_6$) are compressed (also referred to as "folded") into smaller intervals so that the limited display space can better illustrate the details of each event without compromising the amount of detail that is shown.

Thus, in accordance with the embodiment of the present invention as outlined in FIG. 4, the next step in the process (identified as step 420) is to define a threshold time interval $T_{th}$. This threshold is then used as the demarcation point, where all intervals greater than the value $T_{th}$ will be shortened. For example, a threshold value of seven seconds may be selected. Thus, each time period having a value greater than seven seconds will be identified (step 422) as needing to be shortened. It is to be understood that the exact value of $T_{th}$ depends upon the absolute size of the specific design space visualization (e.g., the number of pixels in the display, the dots-per-inch (dpi) value if visualized on a computer screen, and the like).

Applying this threshold to the specific diagram shown in FIG. 5, there are three time periods that identified in step 422 as being larger than the defined threshold value $T_{th}$: namely, time periods $T_1$, $T_3$ and $T_6$. The next step in the process, as defined by step 424, is to determine the fixed time value $T_{fixed}$ that is optimum for representing each over-threshold time period. For example, it may be determined that a three second fixed time value is useful. Again, as with threshold determination, the exact value selected for the fixed time period will be influenced by the number of intervals that are to be shortened, as well as the size of the display being used.

Figure 6:
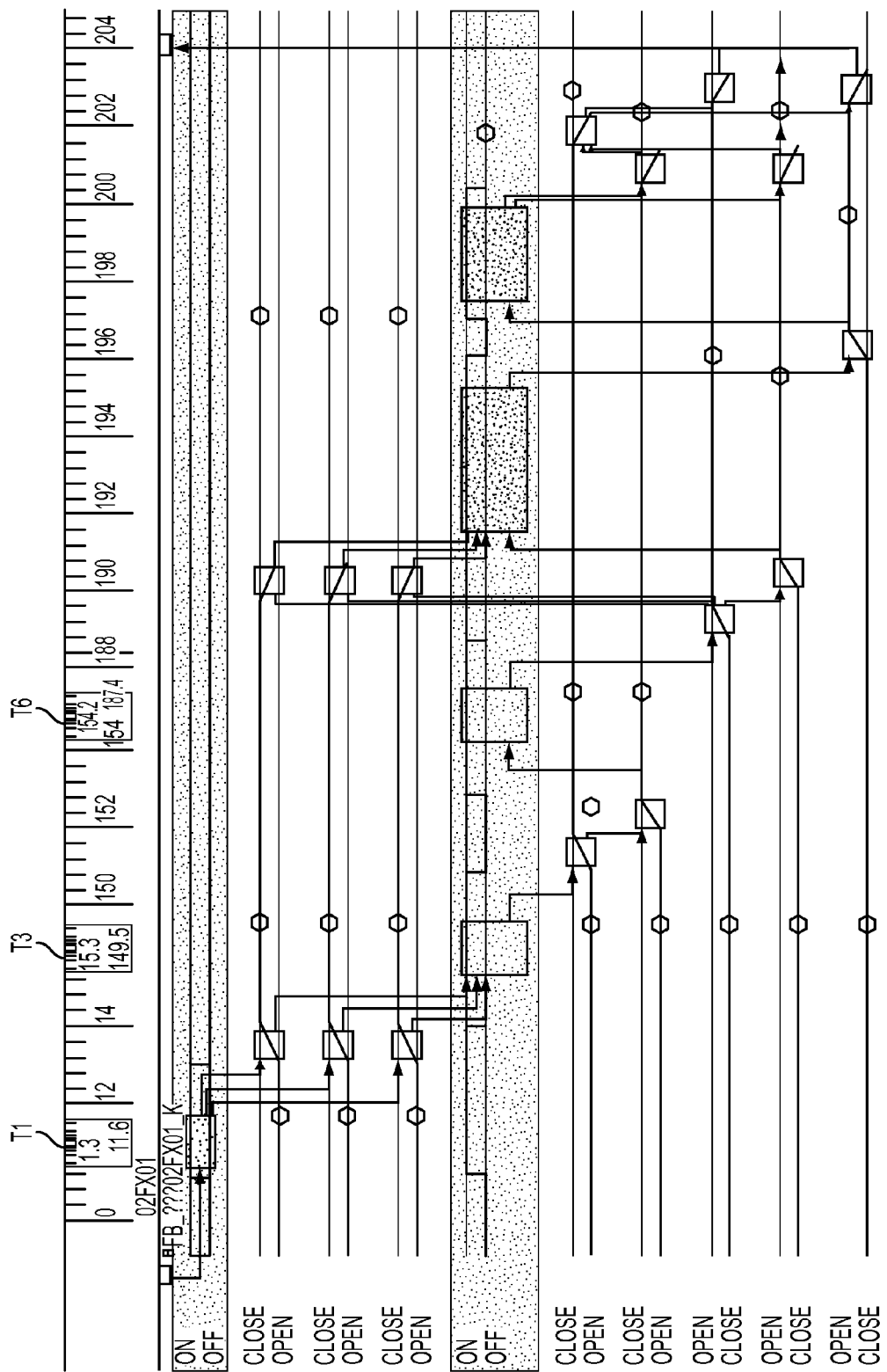
FIG. 6 is a schematic view of a model visualization utilizing a non-linear time scale in accordance with the present invention.

With the fixed time value determined, the time intervals for $T_1$, $T_3$ and $T_6$ are modified accordingly, as indicated in step 426. The resulting displace space is shown in FIG. 6. In particular, by "folding" these longer, inactive timer periods into a predefined value (in this case, three seconds), there is more 'room' along the time axis of the display space for each of the events associated with the points of interest. Thus, the display space retains all of the information contained in the original version, but the non-linear time scale allows for the individual events to be evaluated and visualized with clarity. Particular reference is made to the clarity introduced with the events occurring between point of interest 7 and point of interest 15. In the original as shown in FIG. 5, it is difficult to discern the individual events. The non-linear visualization as shown in FIG. 6 renders each event in detail.

While the flowchart of FIG. 4 is exemplary of a specific process that may be used, it is considered to be one of many alternatives for creating a non-linear time scale for the display space. In general, any method for replacing relatively "long" time periods of inactivity with a shorter time period may be employed in the method of the present invention to create a non-linear time axis for the display space.

Figure 7:
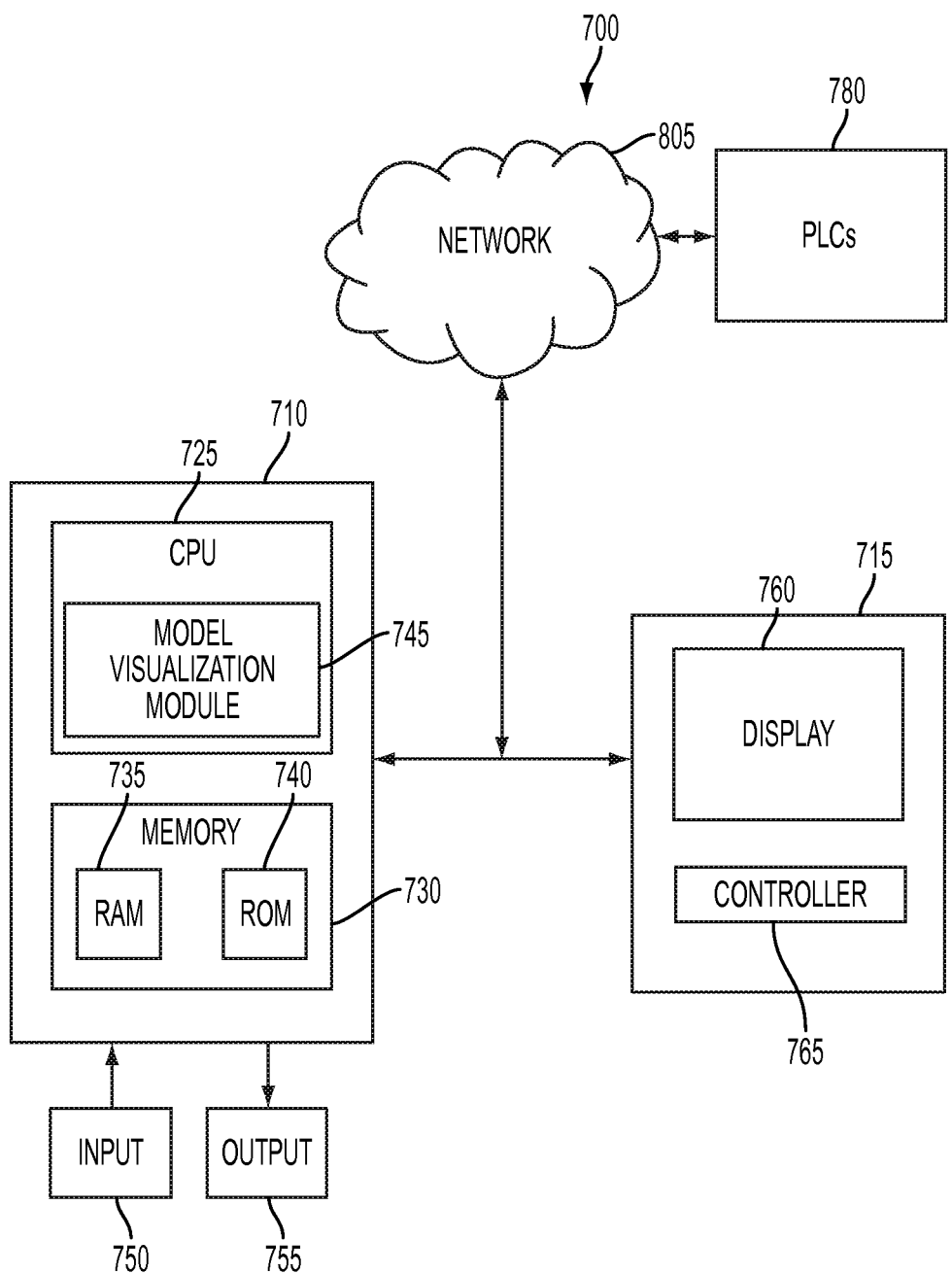
FIG. 7 is a block diagram of an exemplary system useful in association with the creation of a model visualization with a non-linear time scale in accordance with the present invention.

As noted above, the present invention may be embodied in a system for visualizing an electrical machine operation model. FIG. 7 illustrates a system 700 for visualizing an electrical machine operation model according to an exemplary embodiment of the present invention. As shown, system 700 includes a personal computer (PC) or similar device 710, as well as an associated console 715. The system may be connected to one or more PLCs 780 over a wired (or wireless) network 705.

PC 710, which may be a portable computer or laptop computer (or a mainframe or other suitable configuration), includes a central processing unit (CPU) 725 and a memory 730 connected to an input device 750 and an output device 755. CPU 725 includes a model visualization module 745 and that includes one or more methods for visualizing a non-linear time scale electrical machine operation model as discussed herein, including the process as outlined in FIG. 4 for translating the standard linear time visualization to the preferred non-linear time scale model. Although shown in FIG. 7 as residing inside CPU 725, model visualization module 745 can be located outside CPU 725.

Memory 730 includes a random access memory (RAM) 735 and a read-only memory (ROM) 740. Memory 730 can also include a database, disk drive, tape drive, etc., or a combination thereof. RAM 735 functions as a data memory that stores data during execution of a program in CPU 725 and is used as a work area. ROM 740 functions as a program memory for storing a program executed in CPU 725. The program may reside on ROM 740 or on any other computer-usable medium as computer readable instructions stored thereon for execution by CPU 725 or other processor to perform the methods of the invention. Input 750 is constituted by a keyboard, mouse, network interface, etc., and output 755 is constituted by a liquid crystal display (LCD), cathode ray tube (CRT) display, printer, etc.

The operation of system 700 can be controlled from the operator's console 715, which includes a controller 765 (e.g., a keyboard and display 760). Operator's console 715 communications with PC 710 through a network, a bus or other means so that a non-linear time scale visualization created by module 745 can be rendered by PC 710 and viewed on display 760. PC 710 can be configured to operate and display information using, e.g., input 750 and output 755 devices to execute certain tasks. Program inputs, such as a mechanical machine operation model, may be input through input 750 or stored in memory 730.

The foregoing detailed description is to be understood as being in every respect illustrative and exemplary, but not restrictive, and the scope of the invention disclosed herein is not to be determined from this description, but rather from the following claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for visually representing an electrical machine operation model on a display space of a computer display screen, the method comprising:
   (a) developing a display space visualization showing mechanical steps and associated electrical steps and signal transitions along a linear time axis;
   (b) displaying the display space visualization on the computer display screen;
   (c) determining all points of interest associated with start and/or end times of each step and signal transition in the display space visualization developed in step (a);
   (d) identifying all time intervals along the linear time axis that do not include any mechanical steps, electrical steps or signal transitions;
   (e) identifying, by a processor, selected ones of the time intervals identified in step (d) using a number of pixels and dots per inch of the computer display screen;
   (f) compressing, by the processor, the selected ones of the time intervals identified in step (d) to create a non-linear time axis for the display space, allowing all remaining non-identified time intervals to expand and fill the display space accordingly; and
   (g) on the computer display screen, replacing the display space visualization developed in step (a) using the non-linear time axis created in step (f).

2. The method of claim 1, where all selected time intervals are compressed to occupy an identical time period.

3. The method of claim 1, wherein in performing step (f), time intervals are selected if they are longer than a predetermined threshold time period.

4. A method for visually representing an electrical machine operation model on a display space of a computer display screen, the method comprising:
   (a) developing a display space visualization showing all mechanical steps and associated electrical steps and signal transitions along a linear time axis;
   (b) displaying the display space visualization on the computer display screen;
   (c) determining all points of interest associated with start and/or end times of each step and signal transition in the display space developed in step (a), wherein any duplicate points of interest occurring at the same time along the time axis are eliminated;
   (d) sorting the points of interest determined in step (b) in chronological order;
   (e) measuring each time interval between adjacent, chronologically ordered, points of interest;
   (f) by a processor, determining a threshold time interval $T_{th}$ by considering factors including an absolute size limit of the visualization developed in step (a);
   (g) identifying each time interval measured in step (d) that exceeds the threshold time interval $T_{th}$;
   (h) selecting a fixed time value $T_{fixed}$ to be associated with each time interval identified in step (f);
   (i) by the processor, compressing each identified time interval into fixed time value $T_{fixed}$; and
   (j) on the computer display screen, updating the display space visualization developed in step (a) to generate a display space with a non-linear time axis including at least one interval of fixed time value $T_{fixed}$.

5. The method of claim 4 wherein the visualization is provided on a computer screen and the absolute size limit includes parameters of the number of pixels and the dots per inch associated with the computer screen.

6. A non-transitory computer-usable medium having computer readable instructions stored thereon for execution by a processor perform a method for visually representing an electrical machine operation model on a display space, the method comprising:
(a) developing a display space visualization showing mechanical steps and associated electrical steps and signal transitions along a linear time axis;
(b) displaying the display space visualization on the computer display screen;
(c) determining all points of interest associated with start and/or end times of each step and signal transition in the display space visualization developed in step (a);
(d) identifying all time intervals along the linear time axis that do not include any mechanical steps, electrical steps or signal transitions;
(e) identifying, by a processor, selected ones of the time intervals identified in step (d) using a number of pixels and dots per inch of the computer display screen;
(f) compressing, by the processor, the selected ones of the time intervals identified in step (d) to create a non-linear time axis for the display space, allowing all remaining non-identified time intervals to expand and fill the display space accordingly; and
(g) on the computer display screen, replacing the display space visualization developed in step (a) using the non-linear time axis created in step (f).

7. A non-transitory computer-usable medium having computer readable instructions stored thereon for execution by a processor perform a method for visually representing an electrical machine operation model on a display space of a computer display screen, the method comprising:
(a) developing a display space visualization showing all mechanical steps and associated electrical steps and signal transitions along a linear time axis;
(b) displaying the display space visualization on the computer display screen;
(c) determining all points of interest associated with start and/or end times of each step and signal transition in the display space developed in step (a), wherein any duplicate points of interest occurring at the same time along the time axis are eliminated;
(d) sorting the points of interest determined in step (b) in chronological order;
(e) measuring each time interval between adjacent, chronologically ordered, points of interest;
(f) by a processor, determining a threshold time interval $T_{th}$ by considering factors including an absolute size limit of the visualization developed in step (a);
(g) identifying each time interval measured in step (d) that exceeds the threshold time interval $T_{th}$;
(h) selecting a fixed time value $T_{fixed}$ to be associated with each time interval identified in step (f);
(i) by the processor, compressing each identified time interval into fixed time value $T_{fixed}$; and
(j) on the computer display screen, updating the display space visualization developed in step (a) to generate a display space with a non-linear time axis including at least one interval of fixed time value $T_{fixed}$.

* * * * *